United States Patent [19]

Morris, Jr. et al.

[11] Patent Number: 4,666,873
[45] Date of Patent: May 19, 1987

[54] ALUMINUM NITRIDE-BORON NITRIDE COMPOSITE ARTICLE AND METHOD OF MAKING SAME

[75] Inventors: John R. Morris, Jr., Piscataway, N.J.; Richard A. Tanzilli, Malvern, Pa.

[73] Assignee: General Electric Company, Philadelphia, Pa.

[21] Appl. No.: 541,914

[22] Filed: Oct. 14, 1983

[51] Int. Cl.$^4$ .............................................. C04B 35/58
[52] U.S. Cl. ..................................... 501/96; 501/126; 501/127; 501/153; 501/154; 252/518
[58] Field of Search .................. 252/518, 520; 501/96, 501/126, 127, 153, 154

[56] References Cited

U.S. PATENT DOCUMENTS

| | | | |
|---|---|---|---|
| 3,261,667 | 7/1966 | O'Connor | 23/191 |
| 3,352,637 | 11/1967 | Heymer | 23/191 |
| 3,544,486 | 12/1970 | Passmore | 252/520 |
| 3,718,490 | 2/1973 | Morgan | 106/65 |
| 3,915,900 | 10/1975 | Reinmuth et al. | 252/518 |
| 4,519,966 | 5/1985 | Aldinger et al. | 501/96 |
| 4,539,298 | 9/1985 | Komeya et al. | 501/96 |

*Primary Examiner*—Stephen J. Lechert, Jr.
*Attorney, Agent, or Firm*—Allen E. Amgott

[57] ABSTRACT

A process for making a structural ceramic article, such as, an electromagnetic window, is disclosed, wherein the ceramic article is comprised of a densified mixture of not less than 50% by volume aluminum nitride and up to about 50% by volume boron nitride. The ceramic article of the present invention may be used as a shield or protective barrier such as an electromagnetic window for communication or detection devices on high speed transportation or delivery vehicles passing through extremely hostile environments, where it exhibits radar transparency, congruent vaporization kinetics, tailorable dielectric properties, improved thermal shock resistance, improved mechanical toughness and strength, improved spall resistance, improved recession rate, i.e. erosion rate and ablation rate, and high refractoriness.

9 Claims, 5 Drawing Figures

ALUMINUM NITRIDE-BORON NITRIDE COMPOSITE ARTICLE AND METHOD OF MAKING SAME

BACKGROUND OF THE INVENTION

The present invention relates in general to a new and improved article of manufacture especially for use as a protective shield and the method of making the same and in particular to a window transparent to electromagnetic radiation comprising an aluminum nitride-boron nitride composite.

Modern high-speed vehicles such as high-speed aircraft, may be required to pass through a hostile environment. Under these conditions, it may become necessary to provide protection for certain communication and detection apparatus carried by such a vehicle from sources of heat shock and pressure shock. In a high-speed vehicle of the kind under discussion, such shock is typically due to frictional contact with the ambient environment. Protection from heat and pressure shock must be provided without detracting from the ability of the protected apparatus to communicate with the outside of the vehicle by means of electromagnetic radiation within the frequency spectrum of interest. A common way of providing the desired protection is to place the apparatus behind a suitable protective shield or window, which is transparent to the desired frequency spectrum of electromagnetic radiation, sometimes referred to as an electromagnetic window.

Presently available compositions for providing such an electromagnetic window often lack the requisite mechanical strength, toughness and thermal shock resistance. Fused silica is used extensively for electromagnetic windows because it has exceptional radar transparency, high thermal shock resistance and desirable dielectric properties. However, because of its low mechanical strength and toughness, its low spall resistance and its undesirable recession rate, the use of fused silica as a shield for apparatus of the kind discussed above, e.g. for use as an electromagnetic window, has proved to be unsatisfactory in a number of respects.

A material for use as an electromagnetic window, which fulfills more completely the demands placed on it, must improve on the performance of existing materials in their function of shielding and protecting the communication and detection apparatus inside the vehicle, while allowing electromagnetic radiation in the desired frequency spectrum to pass. Ideally, a structure which consists of such an improved material will possess the following attributes: radar transparency, congruent vaporization kinetics, tailorable dielectric properties, thermal shock resistance, mechanical strength and toughness, spall resistance, high refractoriness, and a tailorable recession rate, i.e. erosion rate and ablation rate. Compositions having these properties though of course suitable for other uses, can provide protective shields and covers especially suitable for use as electromagnetic windows in a hostile environment.

OBJECTS OF THE INVENTION

Accordingly, it is an object of the present invention to provide a new and improved shaped article of a ceramic material having a composition comprising, aluminum nitride and boron nitride which exhibits transparency to a selected spectrum of electromagnetic radiation, congruent vaporization kinetics, tailorable dielectric properties, improved thermal shock resistance, improved mechanical strength and toughness, improved spall resistance, improved recession rate, and high refractoriness.

Another object of the present invention is to provide a new and improved ceramic shield which is transparent to electromagnetic radiation in a predetermined frequency spectrum which has an enhanced capability of resisting heat shock and pressure shock in a hostile environment.

It is another object of the present invention to provide a new and improved electromagnetic window in a vehicle, having enhanced thermal and mechanical shock resistance and shaped to conform to the window opening and contours of the vehicle.

Another object of the present invention is to provide a new and improved method for making a ceramic shield which is transparent to electromagnetic radiation, such as an electromagnetic window, resulting in a shield of superior mechanical strength and toughness using a mixture of aluminum nitride and boron nitride.

It is still another object of the present invention to provide a new and improved method for protecting apparatus adapted to communicate by means of electromagnetic radiation from heat shock and pressure shock using a ceramic shield of boron nitride and aluminum nitride which is transparent to said radiation in a predetermined frequency spectrum.

SUMMARY OF THE INVENTION

These and other objects of the present invention are achieved by providing a new and improved shaped ceramic article, such as an electromagnetic window, and a method of making the same, wherein the composite material of the window exhibits transparency to electromagnetic radiation in a predetermined frequency spectrum, congruent vaporization kinetics, tailorable dielectric properties, improved thermal shock resistance, improved mechanical strength and toughness, improved spall resistance, improved recession rate, and high refractoriness. The method of fabricating the aforesaid ceramic article includes the steps of:

(a) mixing aluminum nitride powder having a purity of at least about 95% by weight with boron nitride powder having a purity of at least about 95% by weight, wherein the boron nitride has substantially no particles greater than about 10 microns in size and comprises from about 0.01% to about 50% by volume of the mixture, and wherein the aluminum nitride powder has substantially no particles greater than about 74 microns in size;

(b) shaping the mixture into substantially the desired form of the article; and (c) densifying the mixture in a non-oxidizing medium at a temperature, pressure, and time sufficient to form a structural ceramic.

The resulting ceramic article, e.g. an electromagnetic window, may be used to protect apparatus from damage due to heat or pressure shock without detracting from the ability of such apparatus to communicate through the windows by means of electromagnetic radiation in a predetermined frequency spectrum. For example, where the apparatus is located within a vehicle, the window is shaped to conform to the window opening of the vehicle and to the vehicle contours in the vicinity of such opening and is so used to protect the apparatus against harm.

The foregoing and various other objects of the invention will become clear from the following detailed description taken in conjunction with the accompanying drawings.

DETAILED DESCRIPTION OF THE INVENTION

Figure 1:
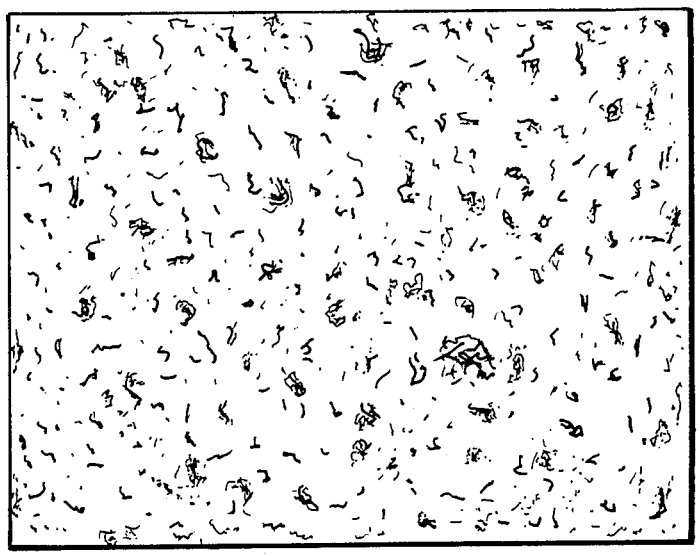
FIG. 1 is a drawing of a photomicrograph (magnified 200 times) showing a 15% by volume dispersion of boron nitride particles in an aluminum nitride matrix after densification.

Aluminum nitride possesses several characteristics which make it suitable as a structural ceramic article in applications requiring radar transparency and strength, such as, the use as an electromagnetic window on a high-speed aircraft. Although aluminum nitride may be suitable in some aspects, it does not possess a complete combination of characteristics which make it desirable for the above applications. In accordance with the present invention, it has been found that if particles of boron nitride are dispersed in a matrix of aluminum nitride to form a composite, the composite has certain new and unexpected desirable characteristics, while preserving the desirable characteristics, such as the radar transparency and congruent vaporization kinetics already present in the pure aluminum nitride.

In the present invention, aluminum nitride powder and boron nitride powder are mixed, formed, and densified to produce a multiphase particulate ceramic material comprising from about 0.01% to about 50% by volume boron nitride. Thus, the boron nitride is the minor phase of the composite, with the balance of the composite, except for the additives specified below, being substantially aluminum nitride, that is, the aluminum nitride constitutes from about no less than 50% to about 99.99% by volume of the composite. The mixing, forming, and densifying may be performed in accordance with techniques known to the art so as to produce a structural ceramic of sound quality.

The primary purpose of the mixing step in the process is to disperse the boron nitride powder in the aluminum nitride powder and thereby form a composite. In certain preferred embodiments, the particle size of the powders is also reduced during the mixing step by milling. The mixing and milling may be performed in any suitable device, for example, a milling device, such as, a conventional ball mill. As used herein, the term "mixing" defines any operation including milling or any combination of mixing and milling which disperses the boron nitride powder in the aluminum nitride powder and provides a boron nitride and aluminum nitride mixture of the designated particle sizes. This mixture can first be formed, if necessary, into a green ceramic body and subsequently densified into a ceramic component.

The maximum particle sizes which may be used within the scope of the present invention is about 74 microns for aluminum nitride and about 10 microns for boron nitride. Preferably, maximum particle size is about 44 microns for aluminum nitride and about 1 micron for the boron nitride. In general, the particle size of the aluminum nitride and boron nitride powders is as small as practical manufacturing limits permit. The tendency of the particles to agglomerate generally limits the particle size ranges which can be obtained by conventional milling techniques. However, the present invention is intended to encompass particle sizes down to the molecular level.

A simultaneous mixing and milling of the powders is preferred due to the reduction in particle size and the degree of agglomeration obtained thereby. Such reduction in particle size and degree of agglomeration results in a ceramic having superior characteristics, for example in the area of mechanical strength and toughness, due to a higher degree of dispersion of the boron nitride in the aluminum nitride. A preferred mixing method comprises milling sub-micron boron nitride powder with aluminum nitride powder less than 44 microns in diameter for 6 hours in the presence of a milling medium, such as, an $Al_2O_3$ medium. In order to further reduce particle size and bring about more complete mixing, a liquid medium may additionally be used during the milling process, e.g. any of several inert, non-reactive liquid media known in the art. By way of example and without limitation, a suitable liquid medium is acetone. In a preferred embodiment, the mixing step embraces wet milling of the aluminum nitride and boron nitride in the presence of acetone as a liquid medium.

Densification of the ceramic composite to produce a ceramic article may be accomplished by any method known in the art, for example, by hot pressing, hot isostatic pressing, pressureless sintering and the like or selected combinations of the preceding techniques. These methods utilize variations in temperature, pressure, and time to bind and consolidate the discrete ceramic powders into a densified ceramic component. The time, temperature and pressure used to form a structural ceramic in accordance with the present invention is not critical, and one skilled in the art can provide appropriate conditions for densifying the mixture to form a structural ceramic. It is only necessary that the step of densifying the mixture be carried out at a temperature, pressure and time sufficient to form a structural ceramic. One preferred set of conditions is shown in Table 1 below.

TABLE 1

EXAMPLES OF VARIOUS CONCENTRATIONS OF BORON NITRIDE IN ALUMINUM NITRIDE

| Volume Percent Boron Nitride In The Composite | Hot Pressing Parameters | | | | |
|---|---|---|---|---|---|
| | Temp. °C. | Pressure (psi) | Time (min) | Atmosphere | Density (g/cc) |
| 0 | 1700 | 3227 | 90 | $N_2$ | 3.26 |
| 5 | 1700 | 6706 | 90 | $N_2$ | 3.29 |
| 10 | 1700 | 6706 | 90 | $N_2$ | 3.26 |
| 15 | 1700 | 9000 | 30 | Ar | 2.96 |
| 25 | 1700 | 6706 | 90 | $N_2$ | 3.02 |
| 35 | 1700 | 6706 | 90 | $N_2$ | 2.95 |

In some methods of densification, for example, hot isostatic pressing and pressureless sintering, the formation of a green ceramic body is required before densification. The process of forming a green body involves shaping the ceramic article so that, shaping and forming occur simultaneously. Methods of forming a green ceramic body are well known to those experienced in the art and include, but are not restricted to, die pressing, isostatic pressing, and slip casting. Thus, according to the present method, the formation of a green body may be a necessary or a preferred step prior to densification.

It is to be understood that, at all stages of processing, the aluminum nitride and boron nitride powders must be protected by a non-oxidizing atmosphere due to the susceptibility of these powders to oxidation. Inert environments which are suitable for use as non-oxidizing atmosphere, are, for example, a vacuum, nitrogen, a noble gas, or the like.

The aluminum nitride and boron nitride should be free of impurities which interact with the components in a manner which compromises the integrity of the structural ceramic, or which compromises any of the desired characteristics or properties of the composite. In accordance with the present invention, it is desirable, though not essential, that the powders be purified so that they are at least about 95% by weight pure. Preferably, these powders are of even greater purity such as, for example, about 98% by weight pure. Whenever possible and within practical limits, the powders are about 99.9% by weight pure. The use of high purity powders improves some of the characteristics of the composite which make the composite suitable for use as an electromagnetic window. For example, high purity powders usually improve radar transparency. In most cases, impurities diminish the excellent radar transparency normally exhibited by the aluminum nitride-boron nitride composite.

Aluminum nitride is used as the major phase of the aluminum nitride-boron nitride composite partly because of its congruent vaporization kinetics. The surface of a congruently vaporizing material is free of the constituent condensed metal phase, i.e. aluminum in the case of aluminum nitride. The presence of a condensed metal, which occurs with such non-congruently vaporizing materials as boron nitride, reduces or prevents radar transmission. In order to aid congruent vaporization kinetics during the vaporization of the composite, a small quantity of an oxygen-containing compound may optionally be added at certain boron nitride volume percentages in the composite. These oxygen-containing compounds may prevent the undesirable effects of non-congruent vaporization kinetics by preventing the deposition of boron as a metal on the surface of the electromagnetic window. The oxygen-containing compounds may be introduced in the form of any oxidizing agent, specifically oxides such as aluminum oxide, boric oxide, or silicon dioxide. Those oxidizing agents which significantly or substantially reduce radar transmission, should not be used. The oxidizing agent may in some instances be added to the composite in an amount of up to about 5% by volume. Preferably however, the oxidizing agent will constitute no more than about 2% by volume. Usually some of those compounds are present in varying amounts as impurities in the aluminum nitride and boron nitride powders.

Figure 2A:
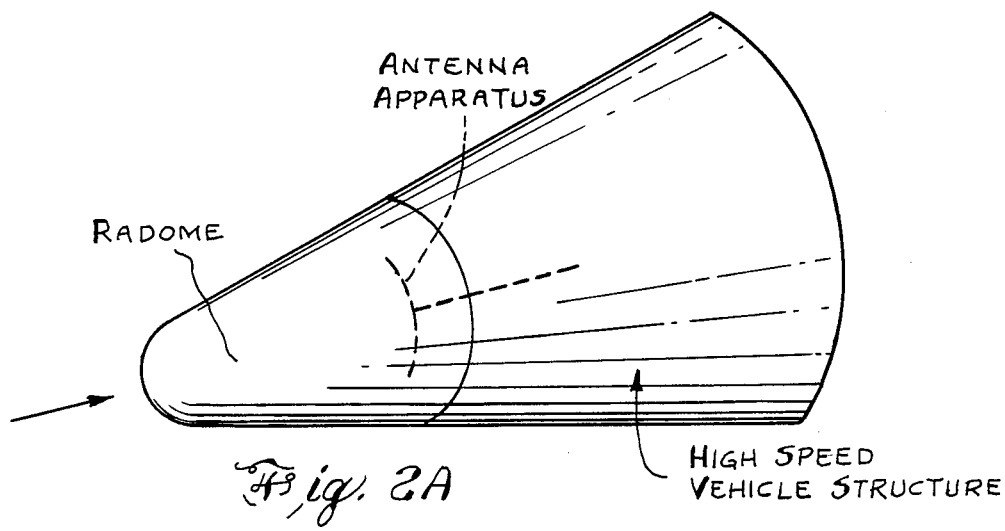
FIGS. 2A and 2B illustrate schematic examples of two high-speed vehicle configurations with electromagnetic windows (radomes, antenna windows) interposed between the external environment and antenna apparatus.
Figure 2B:
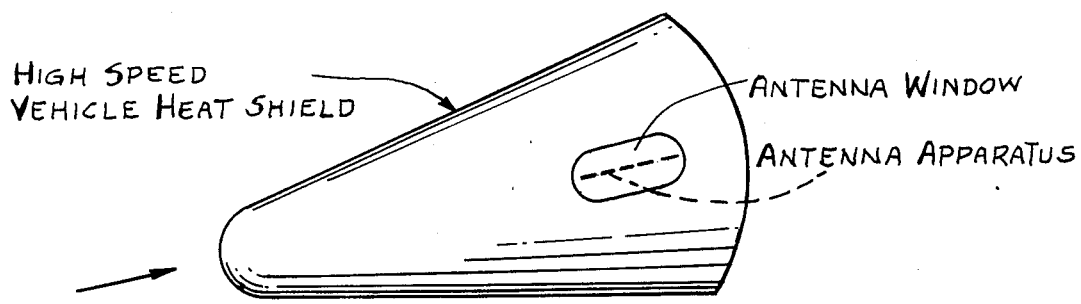

Typically, the shield or electromagnetic window is interposed between the source of heat and pressure shock and the apparatus which communicates through electromagnetic radiation. In a vehicle this may be done by incorporating the window into the structure of the vehicle to form either a radome or an antenna window, e.g. as shown in FIGS. 2A and 2B, respectively. In the latter example, the window or shield fits into a suitable window opening of the vehicle and a single surface is exposed to the source of heat and pressure shock. As shown, the aforesaid surface conforms to the contours of the vehicle in the vicinity of the window opening and its flush therewith.

The following examples further illustrate the practice of the invention insofar as the method of making the article is concerned. They are meant to be exemplary only and are not to be construed as limiting the invention in any way.

Five ceramic windows comprising a composite of aluminum nitride and boron nitride were prepared in accordance with the process of the present invention. In addition, a ceramic window composed of pure aluminum nitride was also prepared for comparative study. Each ceramic window contained varying volume percentages of boron nitride. Commercial grade submicron boron nitride powders were mixed with commercial grade −325 mesh aluminum nitride powders in the concentrations shown in Table 1. These mixtures were wet milled for 6 hours using $Al_2O_3$ as a milling medium, acetone as a liquid medium, and a suitable plastic jar, for instance, one comprised of polypropylene, polyethylene fluorinated ethylenepropylene, polyallomer, and polycarbonate, as for example, a Nalgene ® jar. All powders were handled in a dry box to minimize contact with the atmosphere due to the hygroscopic nature of aluminum nitride. The resulting mixture of powders was consolidated by hot pressing in a die containing a suitable die liner, for instance, a flexible graphite tape, for example, a Grafoil ® die liner, under the temperature, pressure, time and atmosphere shown in Table 1. The density of each resulting ceramic component is shown in Table 1.

FIG. 1, is a drawing of a photomicrograph showing the microstructure resulting from the densification by hot pressing of a 15% by volume dispersion of boron nitride in aluminum nitride. The dark areas in the drawing show the boron nitride phase.

The transparency of a radar transmissive window to a normally incident signal is expressed approximately by the following equation:

$$T \simeq e^{-Bx} \qquad (1)$$

wherein T is the fractional transmittance, x is the thickness of the radar window, and B is the absorption coefficient in units of reciprocal thickness. In turn, the absorption coefficient B is defined in terms of the dielectric constant, K', and the loss tangent, tan S, for a given free space radar wavelength $\lambda_o$, by the relationship:

$$B = \frac{4\pi}{\lambda_o}\left[\frac{K'}{2}(\sqrt{1+\tan^2\delta}-1)\right]^{\frac{1}{2}} \qquad (2)$$

From equations (1) and (2) it is seen that a lower dielectric constant or lower loss tangent will result in a lower absorption coefficient and therefore in a greater radar transparency.

Figure 3:
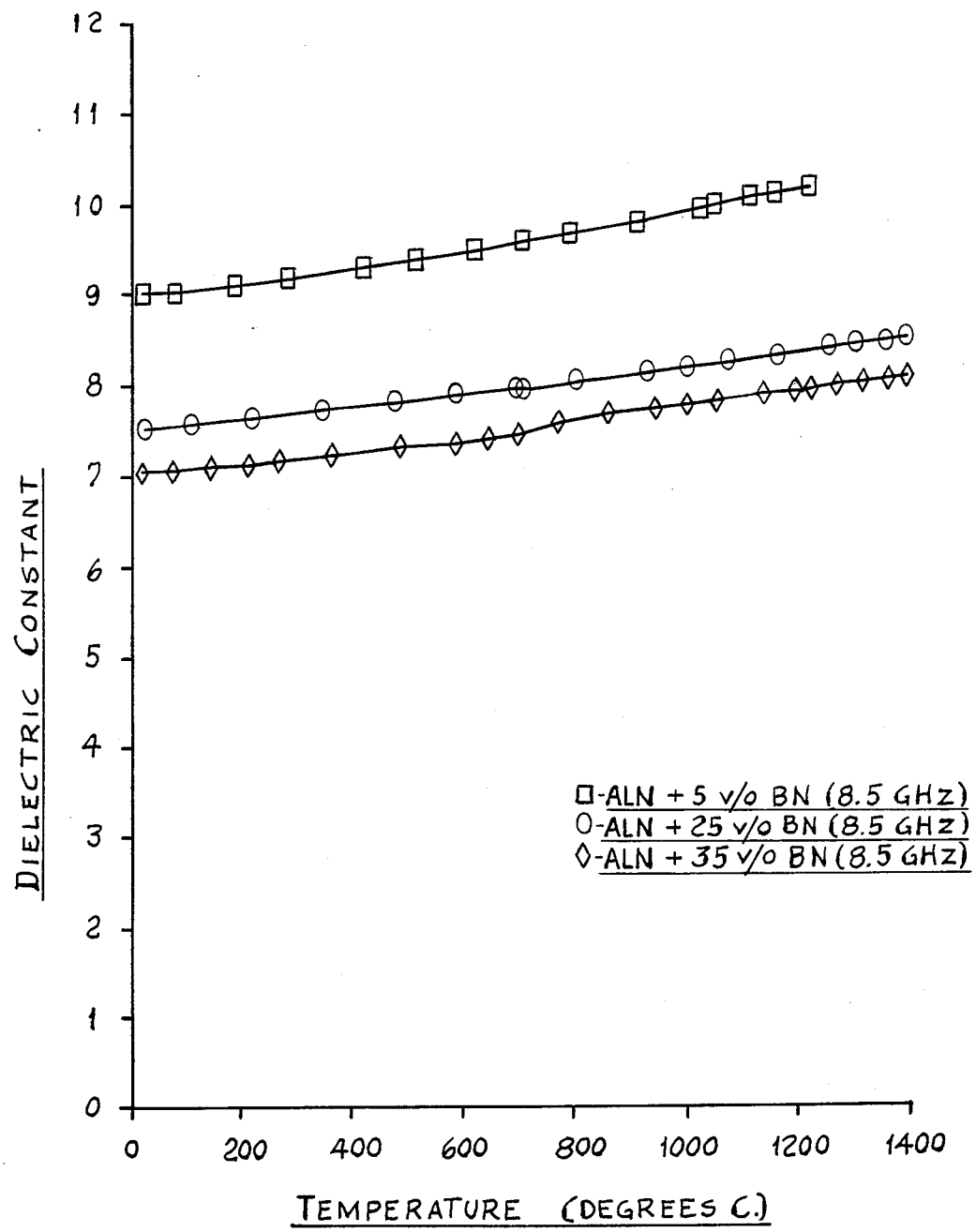
FIG. 3 is a graphical representation of the dependency of the dielectric constant upon temperature for various aluminum nitride-boron nitride ceramic compositions.
Figure 4:
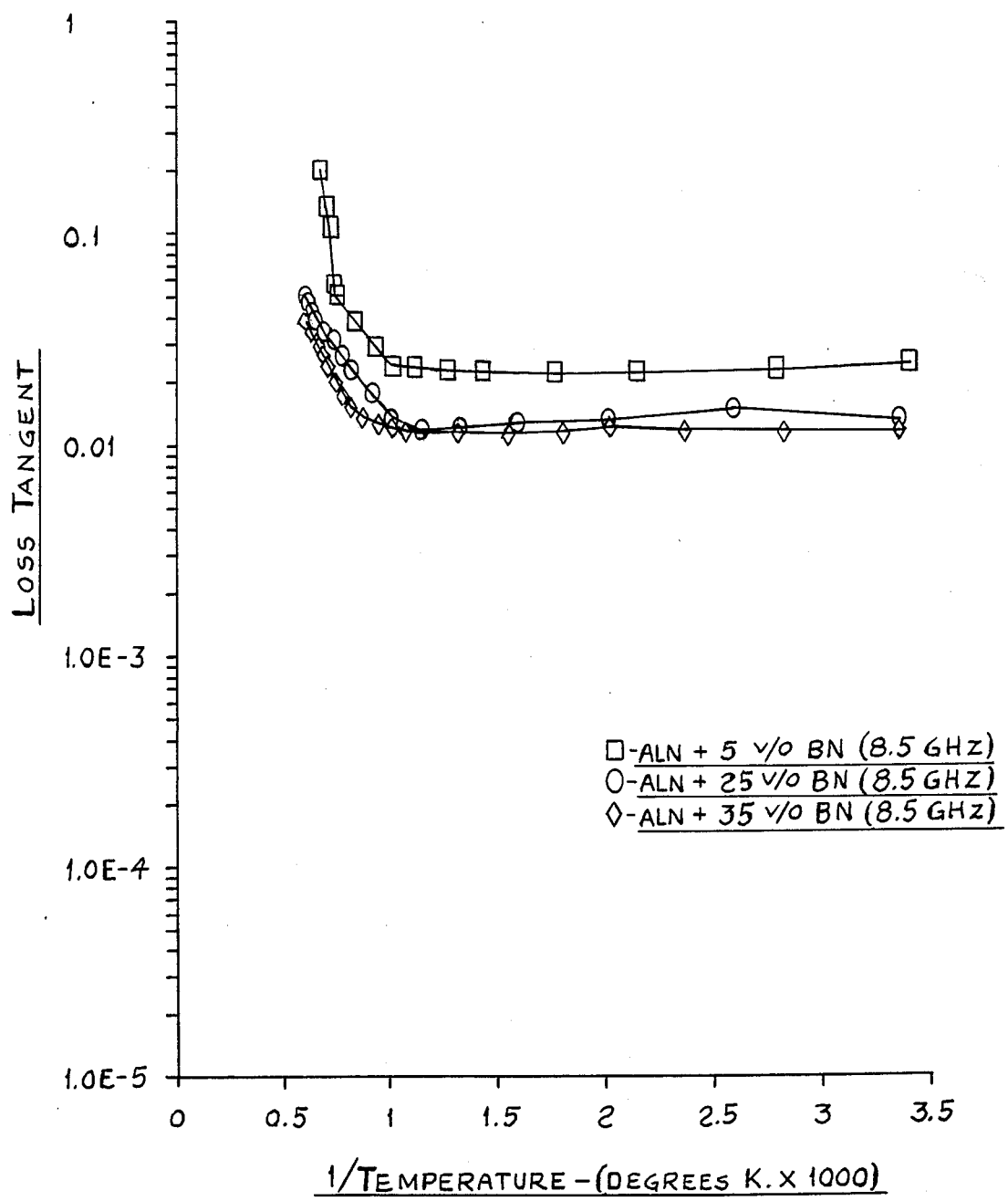
FIG. 4 is a graphical representation of the dependency of the loss tangent upon temperature for various aluminum nitride-boron nitride ceramic compositions.

FIGS. 3 and 4 and Table II show the radar properties, that is, the dielectric constant and loss tangent, of three aluminum nitride-boron nitride composite windows of Table I as a function of temperature and composition at 8.5 GHz. In all cases, the dielectric constant and loss tangent at a given temperature decrease with an increasing "volume percent" of boron nitride in the composite. These reductions translate directly into improved radar transparency as described by equations (1) and (2).

In addition to the overall improvement of the radar transmission properties, it is evident that the temperature sensitivity of the dielectric constant, over the full range of data, and the temperature sensitivity of the loss tangent, above 600° C., is reduced by increasing boron nitride "volume percent". Thus, in addition to higher levels of transmission with increased boron nitride, a radar window in accordance with the present invention further provides a reduced rate of loss in transmission due to increasing temperature.

In the present examples of Table I, optional oxidizing agents were not added to the composite, although oxidizing agents are likely to be present as impurities in the aluminum nitride or boron nitride powders. Thus, these aluminum nitride-boron nitride composite windows should exhibit congruent vaporization kinetics for the volume percentages of boron nitride of which the test samples were fabricated.

Figure 5:
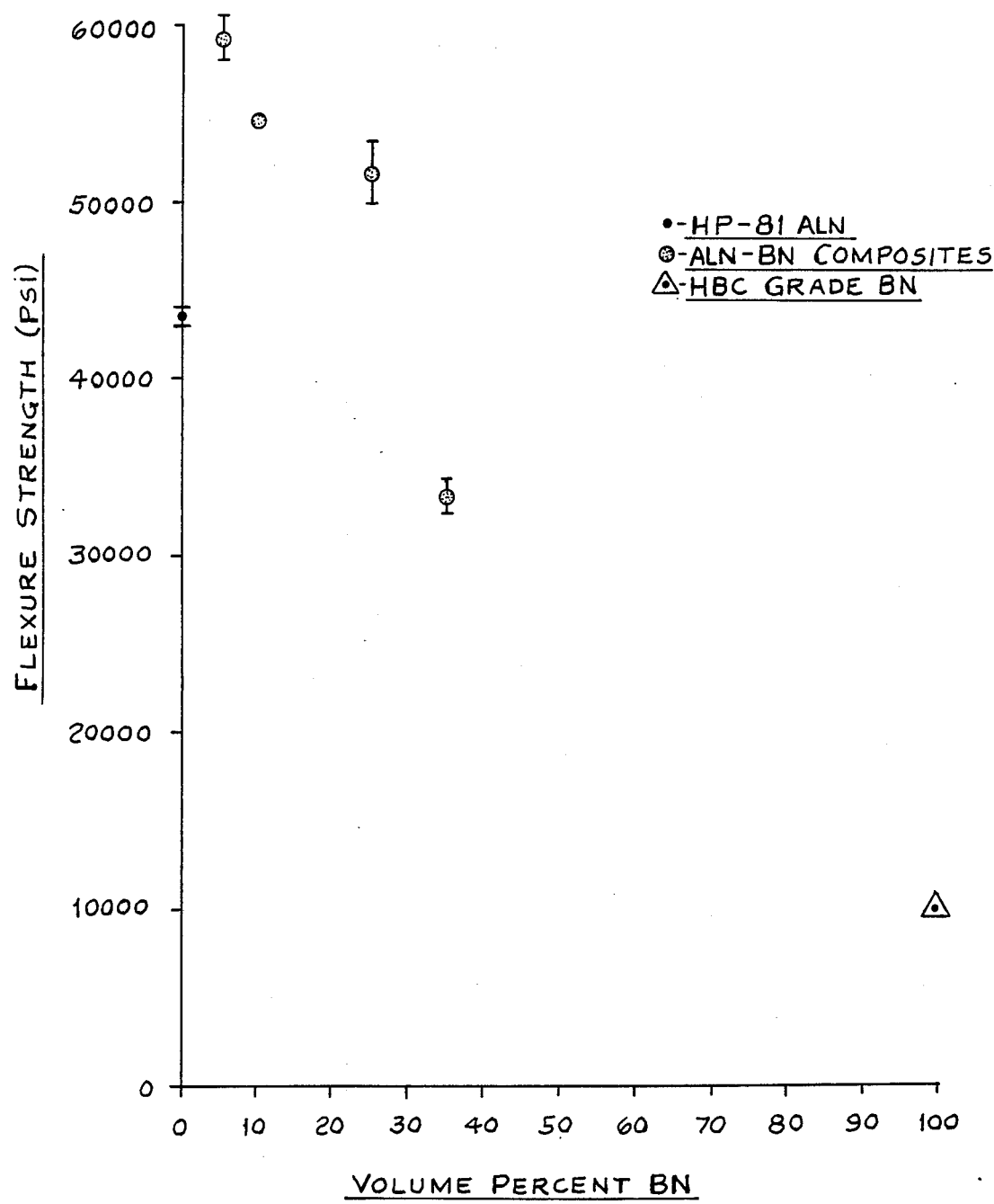
FIG. 5 is a graphical representation of the flexure strength of aluminum nitride-boron nitride ceramic compositions as a function of volume percent boron nitride in the composition.

Significant improvement in the mechanical strength and toughness or flexure strength of the composite is obtained by adding a second phase of dispersed boron nitride to aluminum nitride. This improvement allows aluminum nitride-boron nitride composite windows to withstand greater variation in mechanical pressure or pressure shock. Aluminum nitride ceramics exhibit moderate mechanical strength and toughness. With the addition of boron nitride to the aluminum nitride, a favorable synergism, is manifested in flexure strength and toughness. This synergism occurs between about 5% and about 35% by volume boron nitride. FIG. 5 shows flexure strength in lb/in$^2$ as a function of volume percent boron nitride. An article of the present invention, comprised of an aluminum nitride-boron nitride composite exhibits higher flexure strength than an article comprised of either pure aluminum nitride or pure boron nitride in this range.

TABLE II

Dielectric constant and Loss Tangent as a function of temperature for various compositions of boron nitride in aluminum nitride at 8.5 GHz.

| 5 Volume Percent Boron Nitride | | | 25 Volume Percent Boron Nitride | | | 35 Volume Percent Boron Nitride | | |
|---|---|---|---|---|---|---|---|---|
| T °C. | K' | Tanδ | T °C. | K' | Tanδ | T °C. | K' | Tanδ |
| 21 | 9.00 | .0243 | 23.7 | 7.52 | .0130 | 24 | 7.07 | .0115 |
| 84 | 9.03 | .0231 | 112 | 7.58 | .0144 | 80 | 7.09 | .0114 |
| 189 | 9.12 | .0217 | 224 | 7.64 | .0127 | 150 | 7.13 | .01135 |
| 289 | 9.20 | .0223 | 353 | 7.75 | .0124 | 219 | 7.17 | .0120 |
| 421 | 9.32 | .0226 | 483 | 7.81 | .0117 | 277 | 7.22 | .0111 |
| 515 | 9.38 | .0228 | 594 | 7.89 | .0115 | 369 | 7.26 | .0111 |
| 623 | 9.49 | .0231 | 700 | 7.95 | .0128 | 490 | 7.34 | .0111 |
| 705 | 9.58 | .0240 | 714 | 7.97 | .0132 | 593 | 7.39 | .0112 |
| 793 | 9.67 | .029 | 809 | 8.04 | .0171 | 651 | 7.43 | .01135 |
| 912 | 9.78 | .039 | 938 | 8.14 | .022 | 706 | 7.47 | .0118 |
| 1025 | 9.93 | .052 | 1008 | 8.19 | .026 | 776 | 7.62 | .0124 |
| 1050 | 9.97 | .058 | 1080 | 8.25 | .0305 | 868 | 7.70 | .0134 |
| 1115 | 10.04 | .108 | 1174 | 8.32 | .034 | 951 | 7.75 | .0154 |
| 1160 | 10.07 | .138 | 1263 | 8.39 | .040 | 1008 | 7.80 | .0170 |
| 1220 | 10.18 | .205 | 1313 | 8.44 | .043 | 1062 | 7.85 | .0197 |
| | | | 1363 | 8.48 | .047 | 1144 | 7.92 | .0239 |
| | | | 1400 | 8.53 | .050 | 1205 | 7.96 | .0273 |
| | | | | | | 1233 | 7.99 | .029 |
| | | | | | | 1280 | 8.03 | .032 |
| | | | | | | 1324 | 8.07 | .034 |
| | | | | | | 1365 | 8.09 | .036 |
| | | | | | | 1401 | 8.14 | .039 |

TABLE II-continued (header repeated above)

Significant variations in the thermal shock resistance of the different compositions of the present invention are obtained by varying the amount of boron nitride dispersed in the matrix of aluminum nitride. Aluminum nitride has moderate thermal shock resistance. The addition of boron nitride considerably improves this characteristic. Table 3 below shows the improvement in the thermal shock resistance. The time of failure in seconds more than doubles from 0% by volume to 25% by volume boron nitride, indicating significant improvement in toughness, i.e. resistance to crack extension. In addition, favorable thermal shock correlations are an indication of improved spall resistance as compared to the moderate spall resistance of aluminum nitride structural ceramics. Tests for thermal shock resistance were performed on the examples of Table I according to the method of Schwille, Tanzilli, and Musikant as described in *Thermal Stresses in Severe Environments*, pp. 553–566, edited by D. P. H. Hasselman and R. A. Keller, Plenum Publishing, 1980 which is incorporated herein by reference.

Aluminum nitride-boron nitride structural articles, such as, for example, an electromagnetic window, possess the additional advantage of having a tailorable recession rate. The recession rate is herein defined as the rate of wear in the composite material due primarily to the effects of ablation but could include erosion due to particle impact (e.g. rain, hail, dust, etc.). In accordance with the present invention, depending upon the amount of boron nitride in the composite, the recession rate of the structural component may be adjusted from a more rapid rate at lower "volume percentages" to slower rates at higher "volume percentages".

TABLE III

Thermal shock resistance for the aluminum nitride-boron nitride ceramic windows of Table I as a function of boron nitride composition.

| Volume Percent Boron Nitride In The Composite | THERMAL SHOCK RESISTANCE (Time-to-failure in seconds while exposed to a heating rate of 300 W/cm$^2$) |
|---|---|
| 0 | 1.78 |
| 5 | 3.30 |
| 10 | 1.70 |
| 15 | 4.12 |
| 25 | 4.60 |
| 35 | 3.70 |

Thus, the recession rate of an electromagnetic window may be matched with that of surrounding heat shield material, and aerodynamic difficulties may be avoided which are associated with non-matching recession rates.

Where thermal shock resistance, mechanical strength and toughness, radar transparency, and/or the other properties enumerated above are desirable, the binary composite of aluminum nitride-boron nitride may be used in accordance with the present invention to produce shaped structures which are transparent to electromagnetic radiation or energy. Such a composite is not limited to its use in an electromagnetic window, but may be used in other types of shields as well as in various other articles of manufacture which are required to have at least one of the characteristics enumerated above.

While numerous modifications, changes, substitutions, variations and equivalents of the present invention will now occur to those skilled in the art, it is intended that the invention be limited only by the spirit and scope of the appended claims.

What is claimed is:

1. A shaped article consisting of a ceramic material having a composition comprising:
   from about 0.01% to about 35% by volume of boron nitride, said boron nitride having a purity of at least about 95% by volume and substantially having a maximum particle size of about 10 microns; and
   aluminum nitride, said aluminum nitride having a purity of at least about 95% by volume.

2. The article according to claim 1 wherein said boron nitride and said aluminum nitride are at least about 98% by volume pure.

3. The article according to claim 1 further comprising up to about 2% by volume of an oxidizing agent.

4. The article according to claim 3 wherein said oxidizing agent is selected from the group consisting of aluminum oxide, boron oxide, and silicon dioxide.

5. A window transparent to electromagnetic radiation in a predetermined frequency spectrum, said window consisting of a ceramic material having a composition comprising:
   from about 0.01% to about 35% by volume a dispersion of boron nitride, said boron nitride having a purity of at least about 95% by volume; and
   aluminum nitride, said aluminum nitride having a purity of at least about 95% by volume.

6. A window according to claim 5 wherein said boron nitride substantially has a maximum particle size of about 10 microns.

7. A window according to claim 5 wherein said boron nitride and said aluminum nitride are at least about 98% by volume pure.

8. A window according to claim 5 further comprising up to about 2% by volume of an oxidizing agent.

9. A window according to claim 8 wherein said oxidizing agent is selected from the group consisting of aluminum oxide, boron oxide, and silicon dioxide.

* * * * *